(12) United States Patent
Moore et al.

(10) Patent No.: US 8,924,966 B1
(45) Date of Patent: Dec. 30, 2014

(54) CAPTURE/REVERT MODULE FOR COMPLEX ASSETS OF DISTRIBUTED INFORMATION TECHNOLOGY INFRASTRUCTURE

(75) Inventors: James J. Moore, Los Angeles, CA (US); Jeffrey Nick, Milford, MA (US); Subramanian Kartik, Lisle, IL (US)

(73) Assignee: EMC Corporation, Hopkinton, MA (US)

( * ) Notice: Subject to any disclaimer, the term of this patent is extended or adjusted under 35 U.S.C. 154(b) by 75 days.

(21) Appl. No.: 13/077,213

(22) Filed: Mar. 31, 2011

(51) Int. Cl.
    *G06F 9/455*     (2006.01)

(52) U.S. Cl.
    USPC .............................................. 718/1; 711/162

(58) Field of Classification Search
    USPC ......................................... 718/104, 106, 107
    See application file for complete search history.

(56) References Cited

U.S. PATENT DOCUMENTS

| | | | | |
|---|---|---|---|---|
| 5,027,269 | A * | 6/1991 | Grant et al. .................... | 709/224 |
| 6,710,786 | B1 * | 3/2004 | Jacobs et al. .................. | 715/744 |
| 7,680,919 | B2 | 3/2010 | Nelson | |
| 8,341,625 | B2 * | 12/2012 | Ferris et al. ....................... | 718/1 |
| 8,370,473 | B2 | 2/2013 | Glikson et al. | |
| 8,429,651 | B2 | 4/2013 | Donnellan et al. | |
| 8,656,136 | B2 | 2/2014 | Yamamoto et al. | |
| 2008/0115141 | A1 * | 5/2008 | Welingkar et al. ............ | 718/104 |
| 2009/0182970 | A1 * | 7/2009 | Battista et al. ................ | 711/173 |
| 2009/0241108 | A1 * | 9/2009 | Edwards et al. ................. | 718/1 |
| 2010/0094948 | A1 * | 4/2010 | Ganesh et al. ................ | 709/212 |
| 2010/0306381 | A1 | 12/2010 | Lublin et al. | |
| 2011/0197039 | A1 | 8/2011 | Green et al. | |

OTHER PUBLICATIONS

U.S. Appl. No. 12/827,400, filed Jun. 2010, Moore et al.*
Jiang, Xuxian et tal., Violin: Virtual Internetworking on Overlay Infrastructure, 2005, Purdue University.*
E. Gabriel et al., "Open MPI: Goals, Concept, and Design of a Next Generation MPI Implementation," 9 pages.
"VMWare vSphere," http://www.vmware.com/products/vsphere/, 1 page.
U.S. Appl. No. 12/827,400, filed in the name of Moore et al. on Jun. 30, 2010 and entitled "Sync Point Coordination Providing High Throughput Job Processing Across Distributed Virtual Infrastructure."

* cited by examiner

*Primary Examiner* — Lewis A Bullock, Jr.
*Assistant Examiner* — Melissa Alfred
(74) *Attorney, Agent, or Firm* — Ryan, Mason & Lewis, LLP

(57) ABSTRACT

An information processing system includes a processing platform comprising at least one processing device having a processor coupled to a memory. The processing platform implements a complex asset capture/revert module. The capture/revert module comprises a persistence state machine and a reversion state machine. The capture/revert module is configured to coordinate capture via the persistence state machine of respective states of a plurality of complex assets of distributed information technology infrastructure of the information processing system, and subsequently to coordinate revert via the reversion state machine of at least a given one of the complex assets to its corresponding captured state.

27 Claims, 14 Drawing Sheets

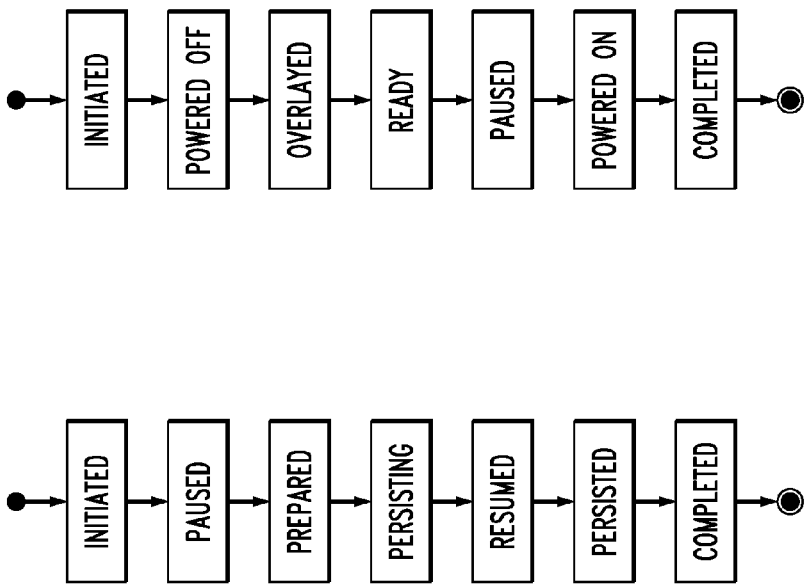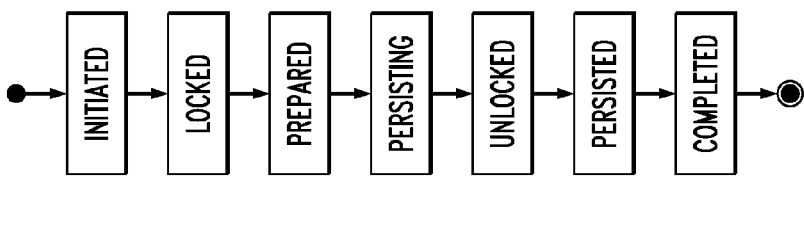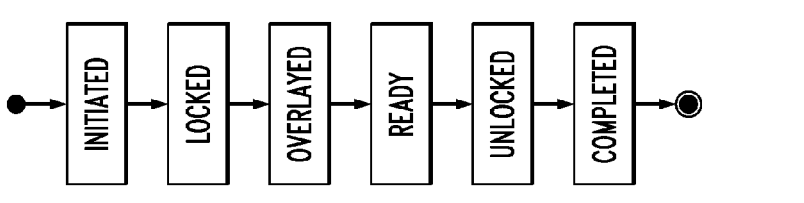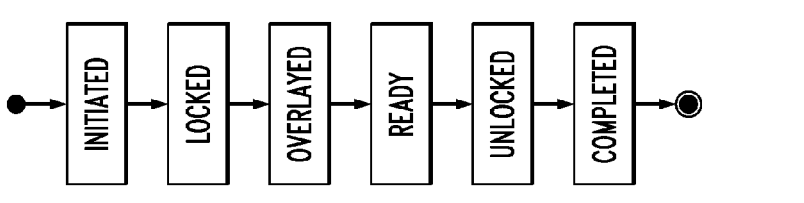

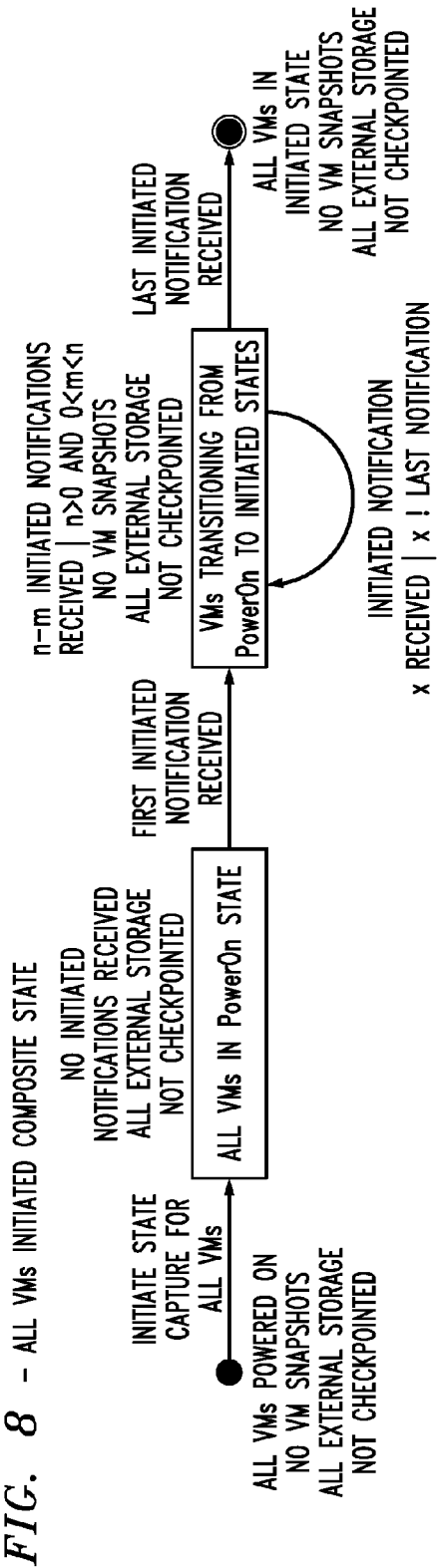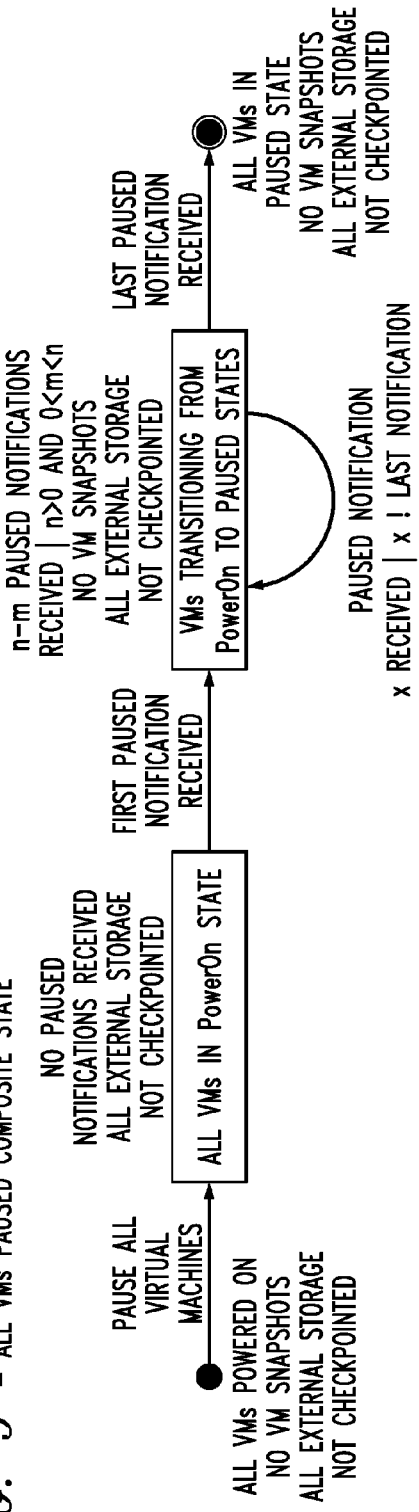
FIG. 8 - ALL VMs INITIATED COMPOSITE STATE
FIG. 9 - ALL VMs PAUSED COMPOSITE STATE

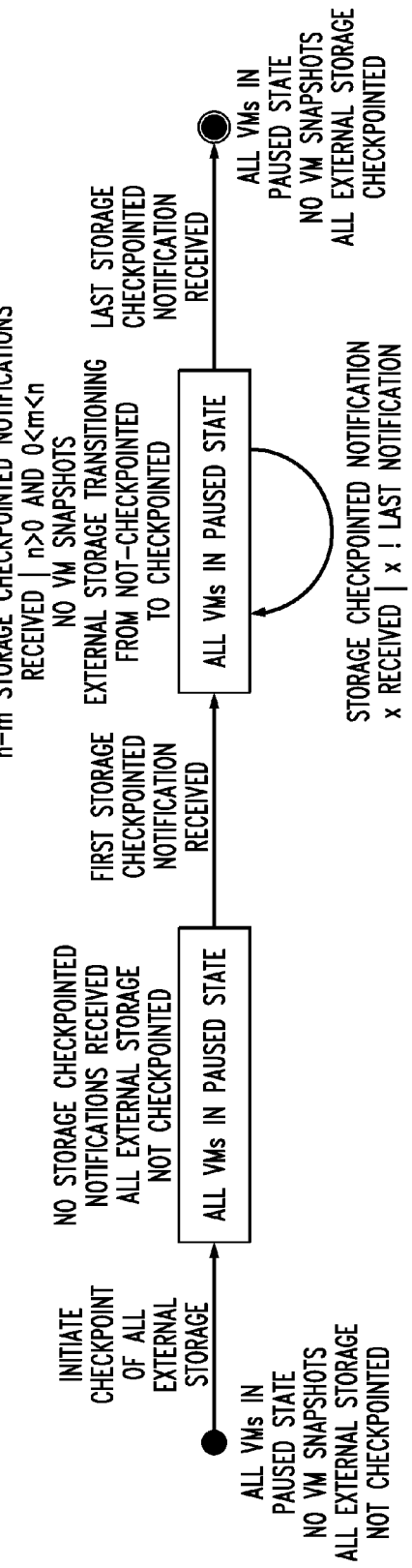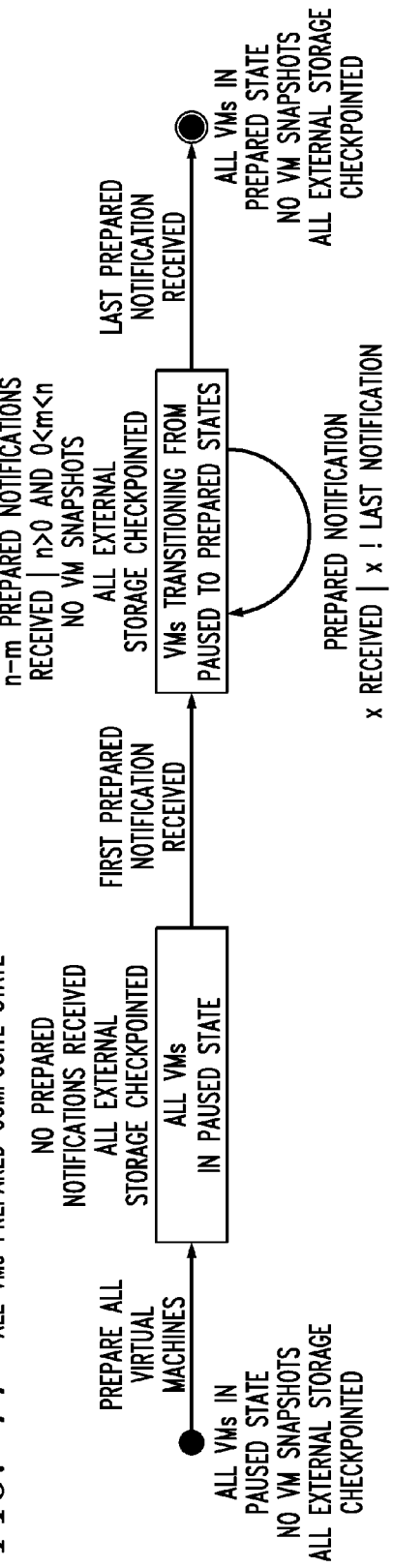

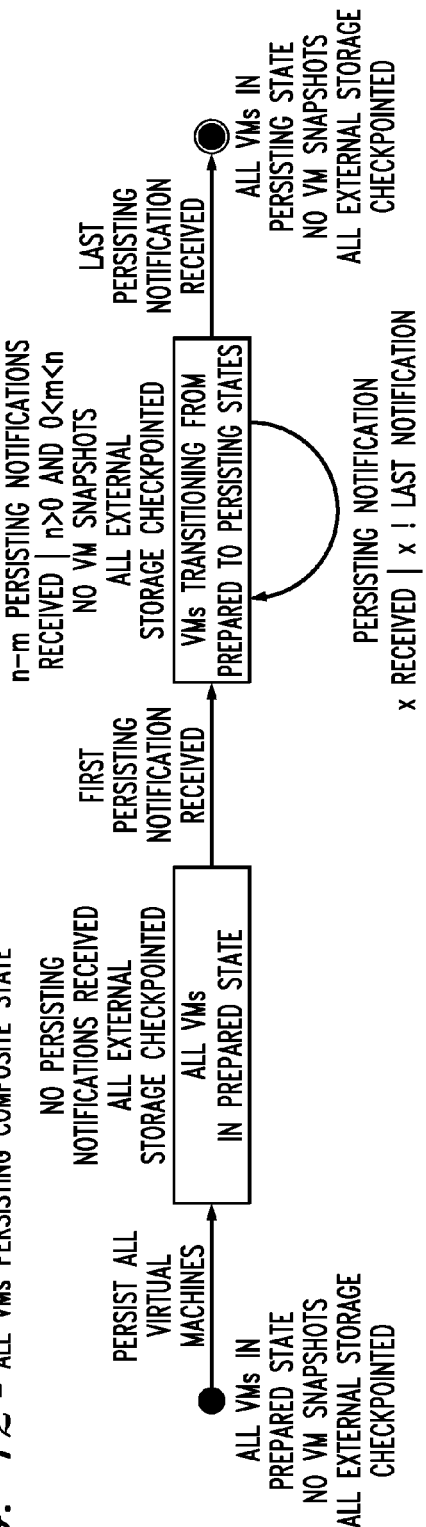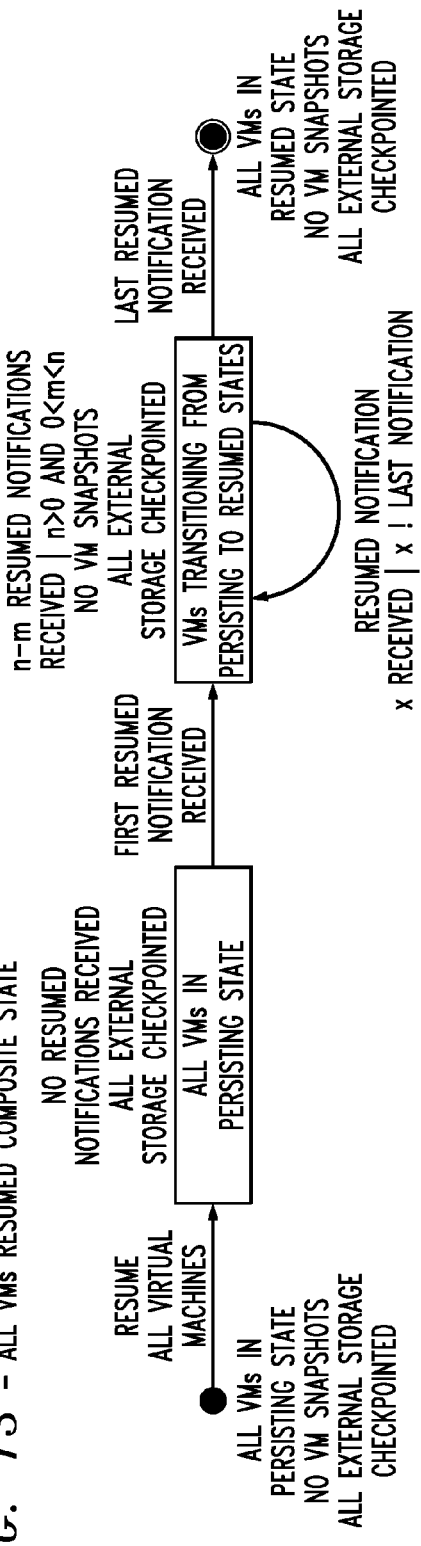

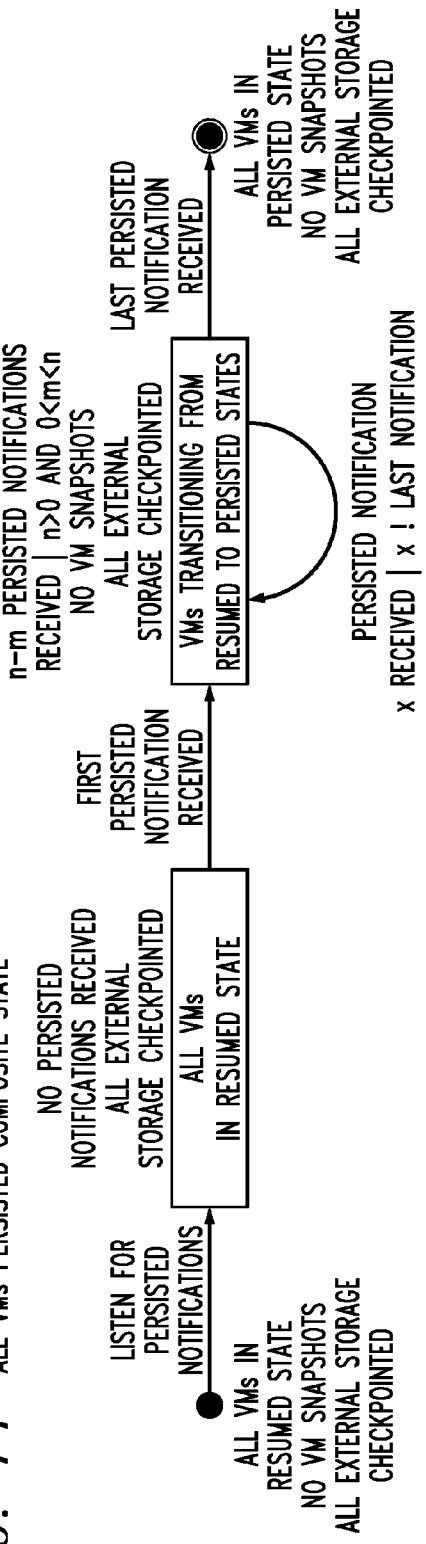
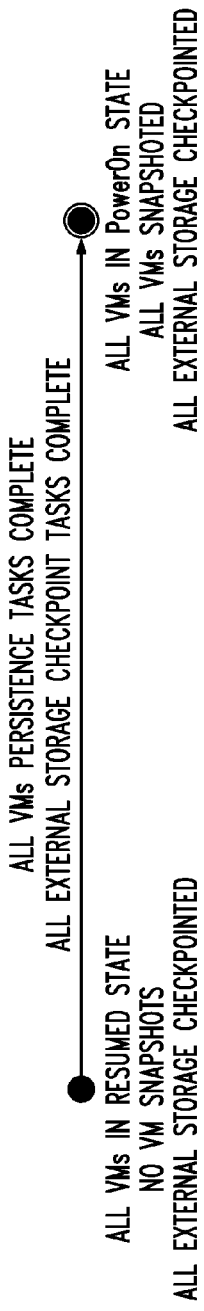
FIG. 14 – ALL VMs PERSISTED COMPOSITE STATE
FIG. 15 – ALL SIMPLE ASSET TASKS COMPLETE COMPOSITE STATE (COMPLEX ASSET PERSISTENCE)

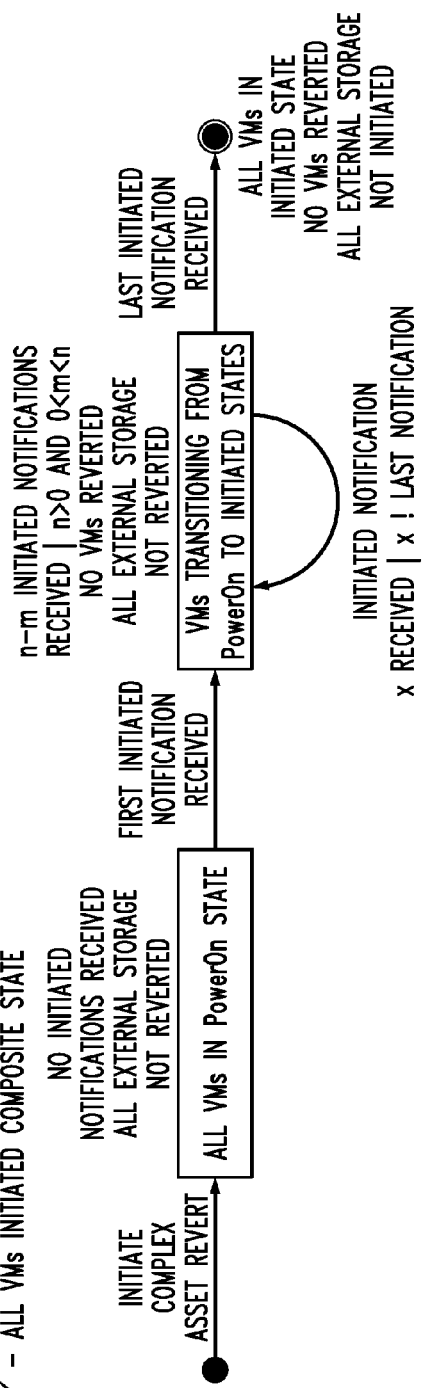
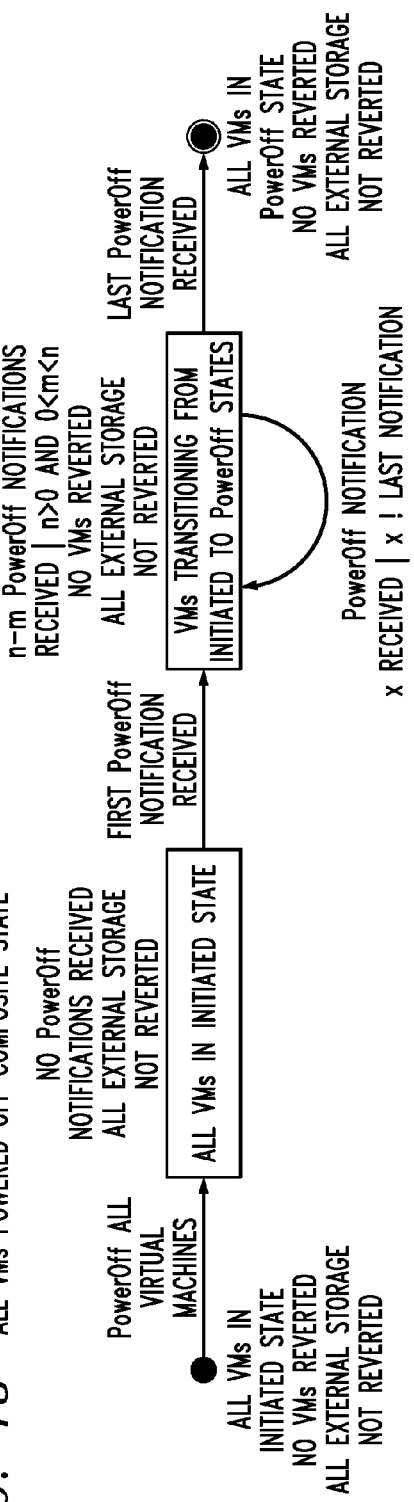

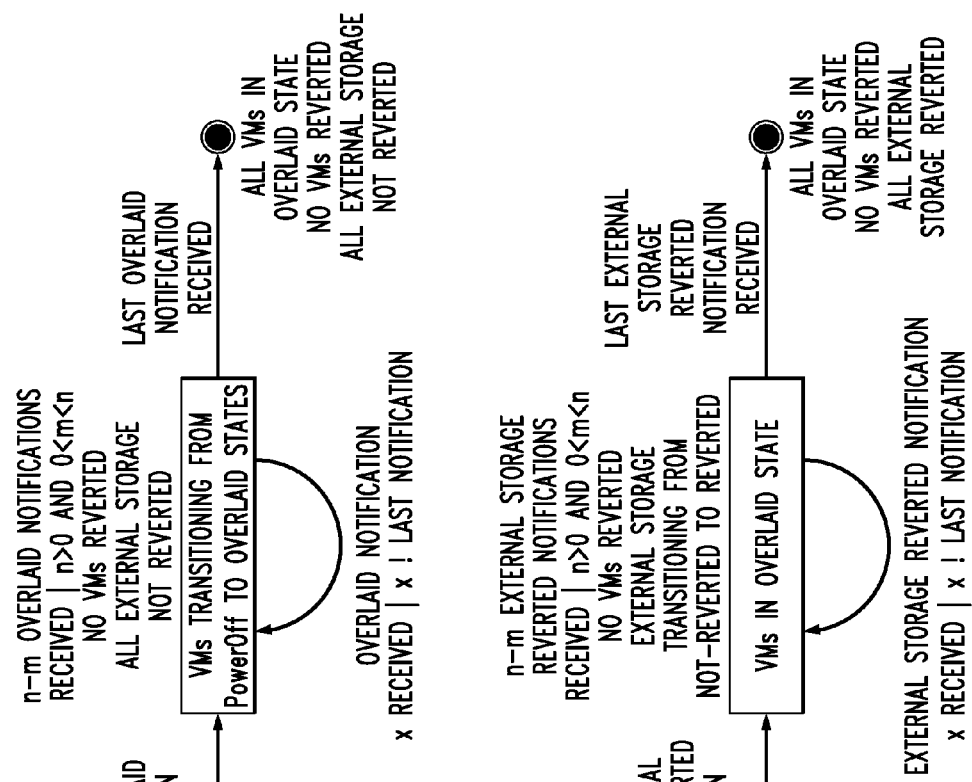
FIG. 19 – ALL VMs OVERLAID COMPOSITE STATE
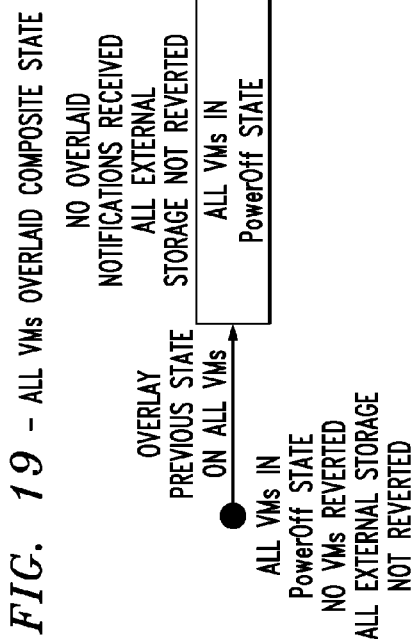
FIG. 20 – ALL EXTERNAL STORAGE OVERLAID COMPOSITE STATE

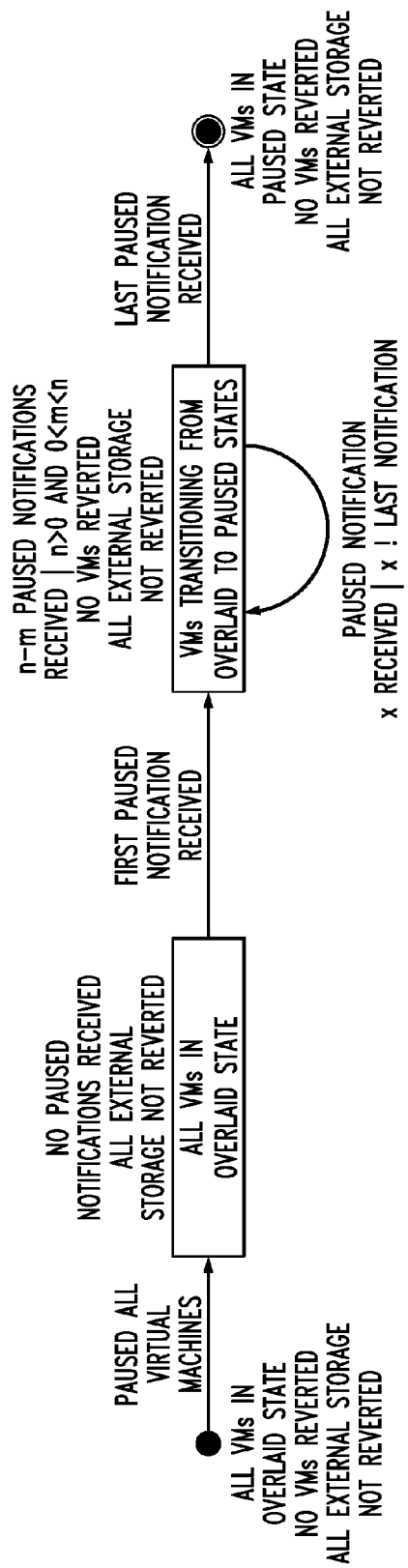
FIG. 21 - ALL VMs PAUSED COMPOSITE STATE

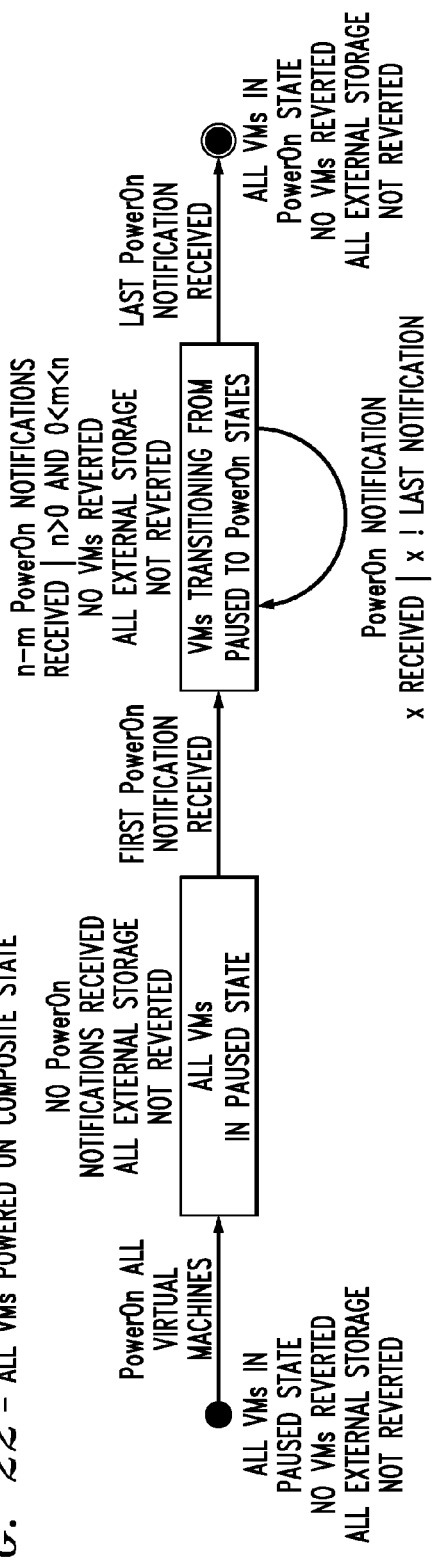
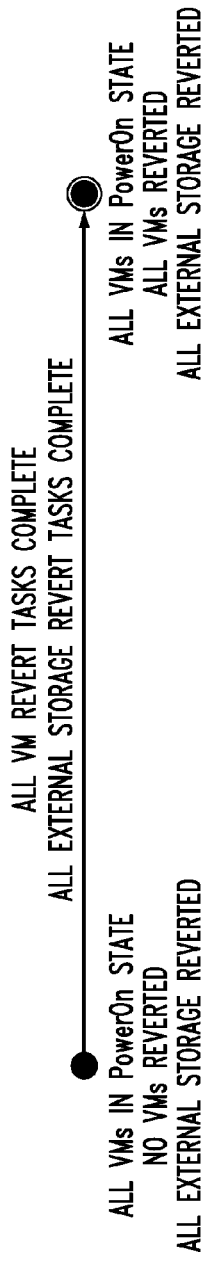
FIG. 22 – ALL VMs POWERED ON COMPOSITE STATE
FIG. 23 – ALL SIMPLE ASSET TASKS COMPLETE COMPOSITE STATE (COMPLEX ASSET REVERSION)

CAPTURE/REVERT MODULE FOR COMPLEX ASSETS OF DISTRIBUTED INFORMATION TECHNOLOGY INFRASTRUCTURE

FIELD OF THE INVENTION

The present invention relates generally to the field of information processing, and more particularly to techniques for managing complex assets in an information processing system comprising distributed information technology (IT) infrastructure.

BACKGROUND OF THE INVENTION

Virtualization is being rapidly adopted across the information technology industry. Virtualization generally allows any number of virtual machines to run on a single physical machine, with each virtual machine sharing the resources of that one physical machine. Different virtual machines can run different operating systems and multiple applications on the same physical computer. Virtualization may be implemented by inserting a layer of software directly on the computer hardware in order to provide a virtual machine monitor or "hypervisor" that allocates hardware resources of the physical computer dynamically and transparently. The hypervisor affords an ability for multiple operating systems to run concurrently on a single physical computer and share hardware resources with each other.

Commercially available virtualization software such as VMware® vSphere™ may be used to build complex IT infrastructure distributed across hundreds of interconnected physical computers and storage devices. Such arrangements advantageously avoid the need to assign servers, storage devices or network bandwidth permanently to each application. Instead, the available hardware resources are dynamically allocated when and where they are needed. High priority applications can therefore be allocated the necessary resources without the expense of dedicated hardware used only at peak times.

As IT infrastructure becomes more complex and more widely distributed over larger numbers of physical and virtual machines, coordinating the operation of multiple architectural components becomes increasingly important. A significant deficiency of conventional practice in this area relates to an inability to perform state capture and revert functions for a consistent point-in-time in a coordinated manner for multiple related components at various layers of distributed infrastructure. There are a variety of well-known conventional techniques available that allow state capture and reversion for particular types of components, such as individual virtual machines, individual storage volumes, individual processes running inside an operating system, distributed processes interacting across multiple operating systems, or a set of virtual machines with local storage visible to the hypervisor. However, these techniques are not capable of persisting point-in-time state of a complex asset in an unobtrusive and dynamic manner. For example, such techniques cannot provide accurate state capture and reversion for a complex asset that includes any number of virtual machines as well as one or more associated external storage volumes that are not visible to or controllable by the hypervisor.

An example of a conventional arrangement of the type noted above is the VIOLIN system described in X. Jiang and D. Xu, "VIOLIN: Virtual Internetworking on OverLay INfrastructure," Purdue University, Laboratory for Research in Emerging Network and Distributed Systems, Jul. 2003. See also A. Kangarlou et al, "Taking snapshots of virtual networked environments," Proceedings of the 2nd International Workshop on Virtualization Technology in Distributed Computing, Reno, Nev. 2007, and A. Kangarlou et al, "VNsnap: Taking snapshots of virtual networked environments with minimal downtime," IEEE/IFIP International Conference on Dependable Systems & Networks, 2009 (DSN '09), pp. 524-533. This particular capture and revert arrangement has a number of important drawbacks. For example, it only addresses capturing and reverting state for virtual machines, and therefore does not capture and revert state for external storage that is mounted by virtual machines but not visible to or controllable by the hypervisor. By relying solely on the hypervisor capability for virtual machine state capture and revert, the VIOLIN system is unable to create a consistent point-in-time state for all virtual machines and any associated external storage volumes hosted on dedicated storage platforms. Also, the VIOLIN system requires the use of custom virtual switches, and is therefore not applicable to generic distributed infrastructures.

SUMMARY OF THE INVENTION

Illustrative embodiments of the present invention overcome the above-described deficiencies of conventional practice by providing improved point-in-time state capture and revert techniques suitable for use with complex assets of a distributed information technology infrastructure, such as, for example, a complex asset comprising one or more virtual machines and/or one or more associated external storage volumes that are not visible to or controllable by a corresponding virtual machine hypervisor. Advantageously, these improved techniques do not require the use of specialized infrastructure, such as custom virtual switches, and are not otherwise constrained to a particular type of distributed infrastructure. The techniques can therefore be readily implemented within existing distributed infrastructure.

In one aspect, a processing platform of an information processing system comprises at least one processing device having a processor coupled to a memory. The processing platform implements a complex asset capture/revert module. The capture/revert module comprises a persistence state machine and a reversion state machine The capture/revert module is configured to coordinate capture via the persistence state machine of respective states of a plurality of complex assets of distributed information technology infrastructure of the information processing system, and subsequently to coordinate revert via the reversion state machine of at least a given one of the complex assets to its corresponding captured state. The persistence state machine may be configured to associate simple asset capture states with corresponding complex asset capture states, and the reversion state machine may be configured to associate simple asset revert states with corresponding complex asset revert states.

As indicated above, the illustrative embodiments advantageously overcome the drawbacks of conventional approaches that fail to provide adequate persistence of and reversion to complex asset state in distributed infrastructure.

These and other features and advantages of the present invention will become more readily apparent from the accompanying drawings and the following detailed description.

BRIEF DESCRIPTION OF THE DRAWINGS

FIGS. 3, 4, 5 and 6 show respective state models for virtual machine persistence, virtual machine revert, storage persistence and storage revert utilized by the complex asset capture/revert module of FIG. 1A.

FIGS. 8-15 show additional details of respective states of the complex asset persistence state machine of FIG. 7.

FIGS. 17-23 show additional details of respective states of the complex asset reversion state machine of FIG. 16.

DETAILED DESCRIPTION

The present invention will be described herein with reference to exemplary information processing systems and associated computers, servers, storage devices and other processing devices. It is to be appreciated, however, that the invention is not restricted to use with the particular illustrative system and device configurations shown. Moreover, the term "information processing system" as used herein is intended to be broadly construed, so as to encompass, for example, private or public cloud computing or storage systems, as well as other types of systems comprising distributed information technology infrastructure.

It should also be noted that embodiments of the present invention may make use of one or more of the sync point coordination techniques disclosed in U.S. patent application Ser. No. 12/827,400, filed Jun. 30, 2010 and entitled "Sync Point Coordination Providing High Throughput Job Processing Across Distributed Virtual Infrastructure," which is commonly assigned herewith and incorporated by reference herein. However, use of such techniques is not a requirement of the present invention.

Figure 1A:
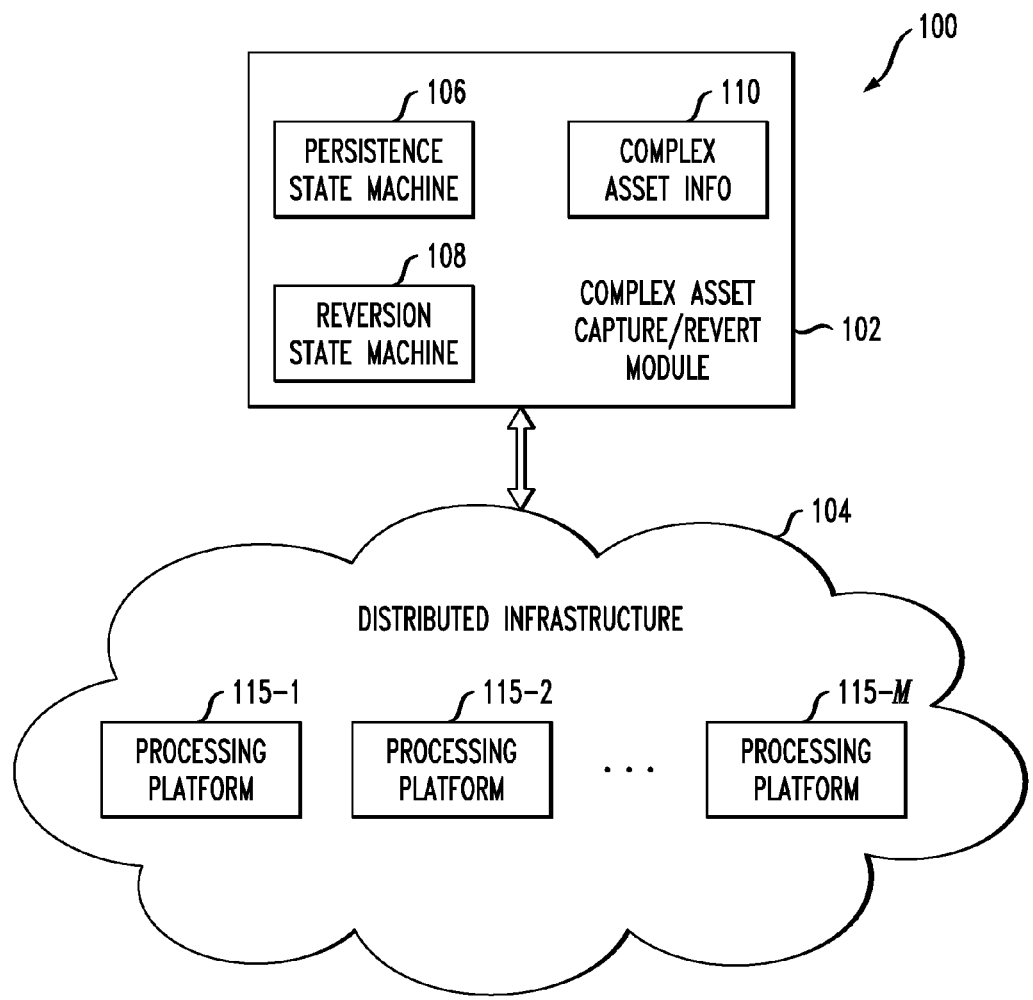
FIG. 1A is a block diagram showing an information processing system comprising a complex asset capture/revert module and associated distributed infrastructure in an illustrative embodiment of the invention.

FIG. 1A shows an information processing system 100 configured in accordance with an illustrative embodiment of the invention. The system 100 comprises a complex asset capture/revert module 102 coupled to or otherwise associated with distributed information technology infrastructure 104. The capture/revert module 102 comprises a persistence state machine 106 and a reversion state machine 108, and processes information 110 regarding complex assets of the distributed infrastructure 104.

As will be described in greater detail below, the capture/revert module 102 is configured to coordinate capture via the persistence state machine 106 of respective states of a plurality of complex assets of the distributed infrastructure 104 and subsequently to coordinate revert via the reversion state machine 108 of at least a given one of the complex assets to its corresponding captured state. The capture/revert module 102 may run on a computer, server or other processing platform element, which may be viewed as an example of what is more generally referred to herein as a "processing device."

Although shown as separate from the distributed infrastructure 104 in FIG. 1A, the capture/revert module 102 may be implemented at least in part within the distributed infrastructure 104.

Figure 1B:
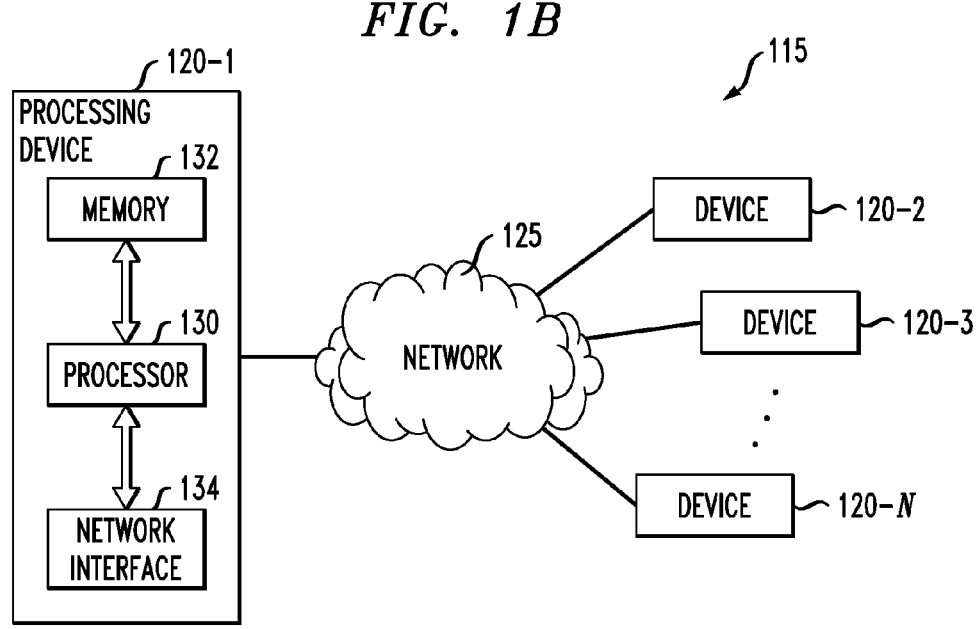
FIG. 1B shows one possible implementation of a portion of one of the processing platforms of the FIG. 1A system.

The distributed infrastructure 104 comprises a plurality of processing platforms 115-1, 115-2, . . . 115-M. One possible implementation of at least a portion of one of the processing platforms 115 of the distributed infrastructure 104 is shown in FIG. 1B. In this implementation, the processing platform comprises a plurality of processing devices, denoted 120-1, 120-2, 120-3, . . . 120-N, which communicate with one another over a network 125. A given such processing device may comprise, for example, a computer, a server, a storage platform, or another type of processing platform element, and may be used to implement at least a portion of the capture and revert functionality of the system 100.

The processing device 120-1 in the processing platform 115 comprises a processor 130 coupled to a memory 132. The processor 130 may comprise a central processing unit (CPU), a microprocessor, a microcontroller, an application-specific integrated circuit (ASIC), a field programmable gate array (FPGA) or other type of processing circuitry, as well as portions or combinations of such circuitry elements. The memory 132 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device such as the device 120-1 causes the device to perform functions associated with state capture and revert in the system 100. One skilled in the art would be readily able to implement such software given the teachings provided herein. Other examples of computer program products embodying aspects of the invention may include, for example, optical or magnetic disks, or other storage devices, or suitable portions or combinations of such devices.

Also included in the processing device 120-1 is network interface circuitry 134, which is used to interface the processing device with the network 125 and other system components. Such circuitry may comprise conventional transceivers of a type well known in the art.

The other processing devices 120 of the processing platform 115 are assumed to be configured in a manner similar to that shown for processing device 120-1 in the figure.

The processing platform 115 shown in FIG. 1B may comprise additional known components such as batch processing systems, parallel processing systems, physical machines, virtual machines, virtual switches, storage arrays, storage volumes, etc. Again, the particular processing platform shown in the figure is presented by way of example only, and system 100 may include additional or alternative processing platforms, as well as numerous distinct processing platforms in any combination.

The term "distributed infrastructure" as used herein is therefore intended to be construed broadly so as to encompass, by way of example and without limitation, arrangements that include virtual infrastructure such as hypervisors and virtual machines, in combination with associated physical infrastructure such as physical computers, servers, storage devices or other processing devices.

An example of a commercially available hypervisor platform that may be used to implement portions of the distributed infrastructure 104 in one or more embodiments of the invention is the VMware® vSphere™ which may have an associated virtual infrastructure management system such as the VMware® vCenter™. The underlying physical infrastructure may comprise one or more distributed processing platforms that include hardware products such as VPLEX®, Celerra® or CLARiiON®, all commercially available from EMC Corporation of Hopkinton, Mass. A variety of other storage products, such as VNX and Symmetrix VMAX, both also from EMC Corporation, may be utilized to implement at least a portion of the distributed infrastructure 104.

It is to be appreciated that a given embodiment of the system 100 may include multiple instances of the elements 102 and 104, and other system elements, although only single instances of such elements are shown in the system diagram of FIG. 1A for clarity and simplicity of illustration.

Also, numerous other arrangements of computers, servers, storage devices or other processing devices are possible in the information processing system 100. Such devices can communicate with other elements of the information processing system 100 over any type of network, such as a wide area network (WAN), a local area network (LAN), a storage area network (SAN), a satellite network, a telephone or cable network, or various portions or combinations of these and other types of networks.

Figure 1C:
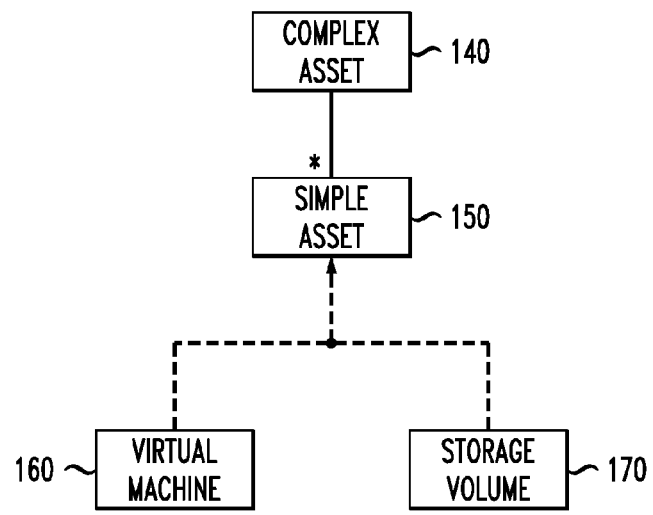
FIG. 1C shows components and related cardinalities of a complex asset processed by the complex asset capture/revert module in the FIG. 1A system.

FIG. 1C illustrates the configuration of a complex asset 140 for which state capture and revert is performed by the capture/revert module 102 in the system 100. A given complex asset such as complex asset 140 may comprise any number of simple assets that have been logically assembled into a larger structure, where simple assets in the present embodiment generally comprise individual virtual machines or storage volumes, also referred to as respective "compute" and "storage" simple assets. Thus, grouping any number of virtual machines with zero or more external storage volumes may be viewed as creating a complex asset, as that term is utilized herein. In the diagram of FIG. 1C, the complex asset 140 is shown in Unified Modeling Language (UML) format and comprises at least one simple asset 150 which illustratively comprises at least one virtual machine 160 and at least one storage volume 170.

Figure 2A:
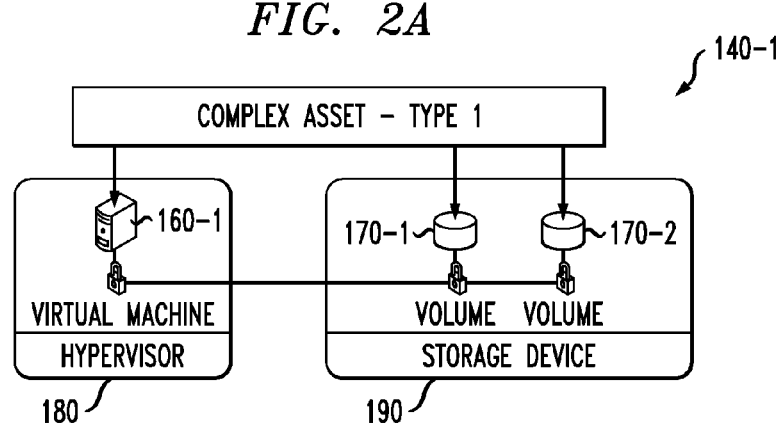
FIGS. 2A, 2B and 2C show examples of different complex asset types that may be processed by the complex asset capture/revert module of FIG. 1A.
Figure 2B:
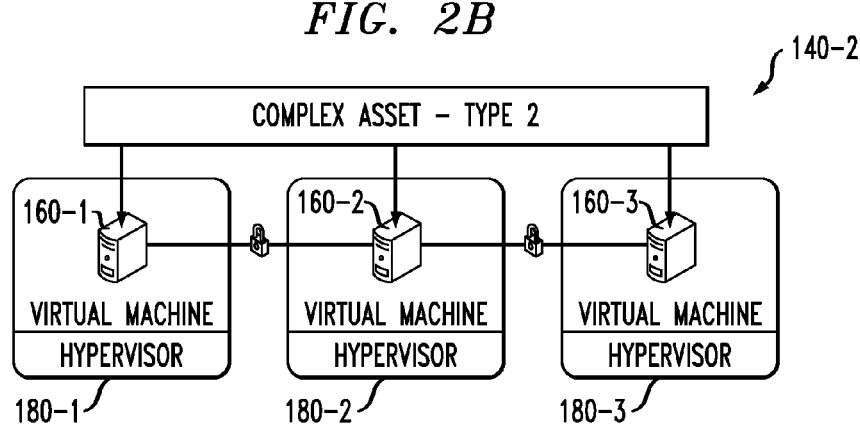
Figure 2C:
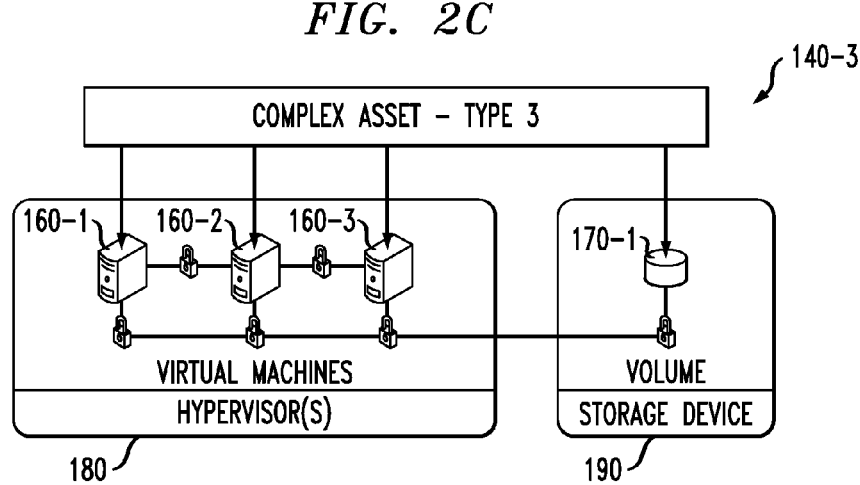

Complex assets can be assembled from simple assets in a variety of ways. All simple assets, associated with a given complex asset, can be co-located in a single datacenter or may be scattered across a geographically diverse infrastructure. They can reside in a single server or processing device, or can be distributed across multiple servers or other processing devices. FIGS. 2A, 2B and 2C illustrate three distinct examples of complex assets, denoted complex asset Type 1, Type 2, and Type 3, respectively, and also designated by reference numerals 140-1, 140-2 and 140-3, respectively. Of course, these are only examples, and numerous other types of complex assets may be subject to state capture and reversion using the techniques of the present invention.

Referring initially to the diagram of FIG. 2A, the Type 1 complex asset 140-1 has been provisioned with simple assets for compute and remote storage. More particularly, it comprises a single virtual machine 160-1, deployed on a single hypervisor 180, which is assumed to be on an individual physical machine External storage has been provisioned on a single storage device 190. In the particular arrangement shown, there are two storage volumes 170-1 and 170-2 residing on the single storage device 190, although in other examples of this complex asset type the two storage volumes may be deployed on two different storage devices. The Type 1 complex asset may therefore be defined as having the following simple asset allocations: 1 compute and 2 storage.

As shown in FIG. 2B, the Type 2 complex asset 140-2 has been provisioned with compute simple assets only. More particularly, it comprises three virtual machines 160-1, 160-2 and 160-3, deployed on three distinct hypervisors 180-1, 180-2 and 180-3, each of which is assumed to be deployed on its own physical machine. External storage has not been provisioned. In the particular arrangement shown, each virtual machine resides on a dedicated hypervisor, although in other examples of this complex asset type there may be two hypervisors supporting three virtual machines, with one hypervisor supporting two virtual machines and the other hypervisor supporting one virtual machine, or three virtual machines deployed on one hypervisor. All cases are valid deployment examples of a complex asset containing three virtual machines. The Type 2 complex asset would therefore have the following simple asset allocations: 3compute.

FIG. 2C illustrates the Type 3 complex asset 140-3. This complex asset has been provisioned with compute and remote shared storage simple assets. It comprises multiple virtual machines 160-1, 160-2 and 160-3, deployed on a single hypervisor 180, which is assumed to be on an individual physical machine. External storage has been provisioned on a single storage device 190. In this case there is a single shared storage volume 170-1 residing on the single storage device 190. This storage volume is mounted within each virtual machine by a client in the virtual machine operating system. The hypervisor is unaware of the shared storage mounted inside of the virtual machines. The Type 3 complex asset is therefore defined as having the following simple asset allocations: 3 compute and 1 storage.

As indicated previously, conventional capture and revert techniques are unable to adequately handle complex assets such as those described above. For example, these conventional techniques are unable to provide capture and revert for a complex asset comprising multiple virtual machines and one or more associated external storage volumes that are not visible to or controllable by a corresponding virtual machine hypervisor. Such external storage volumes may be provided by any of a number of different types of storage devices, including, by way of example, SANs, network attached storage (NAS), or other types of storage technologies. However, the capture/revert module 102 is advantageously configured to ensure that unobtrusive and dynamic point-in-time state capture and revert can be provided for these and other types of complex assets implemented in distributed infrastructure 104.

More particularly, the complex asset capture/revert module 102 provides an ability to ensure that capture and revert of a consistent state can be achieved, across any number of virtual machines and zero or more external storage volumes, in an unobtrusive and dynamic manner. The paradigm is unobtrusive because assets are unaware of the mechanism affording their resiliency. For instance, it is possible to provide resiliency to a cluster of virtual machines with or without mounted external storage, running any operating system, which may be executing processes containing no logic allowing them to account for failures. The paradigm is dynamic because assets do not require manual intervention to place them in a safe state before they are persisted or reverted. The methodology introduces a mechanism to guarantee that all simple assets, within a given complex asset, have their state captured/reverted at a particular point-in-time. The technique allows for simple assets to be coupled via any interconnect mechanism.

Persisting and reverting a complex asset can potentially be a lengthy procedure because of the potentially enormous quantity of data that may be associated with the simple assets. However, while the end-to-end state persistence or revert process may be lengthy, this does not mean the downtime of the complex asset needs to be significant. In fact, the actual amount of time spent idle can be quite minimal. For virtual machines persisting state, a hypervisor is able to maintain the memory image of a virtual machine at time $t_n$, and persist that memory image to disk in an asynchronous manner while the virtual machine is live. For external storage volumes capturing state, a storage device is able to persist cache and create a volume delta associated with the time $t_n$. For virtual machines reverting state, a hypervisor is able to revert the virtual machine image immediately, load just enough pages into memory for the virtual machine to begin execution, and schedule the virtual machine while the rest of its memory is loaded. For storage volumes reverting state, the storage device is able to quickly load the minimal cache associated with the storage checkpoint, overlay the delta in an expedited manner, and unlock the volume while the rest of its cache is loaded. This process is typically very fast because of the maturity associated with external storage platforms.

The operation of the complex asset capture/revert module 102 will now be described in greater detail with reference to state diagrams shown in FIGS. 3 through 23.

The persistence state machine 106 of the capture/revert module 102 is based at least in part on a virtual machine persistence state model and a storage persistence state model. These state models are shown in FIGS. 3 and 5, respectively. Similarly, the reversion state machine 108 of the capture/revert module 102 is based at least in part on a virtual machine reversion state model and a storage reversion state model. These state models are shown in FIGS. 4 and 6, respectively.

Figure 7:
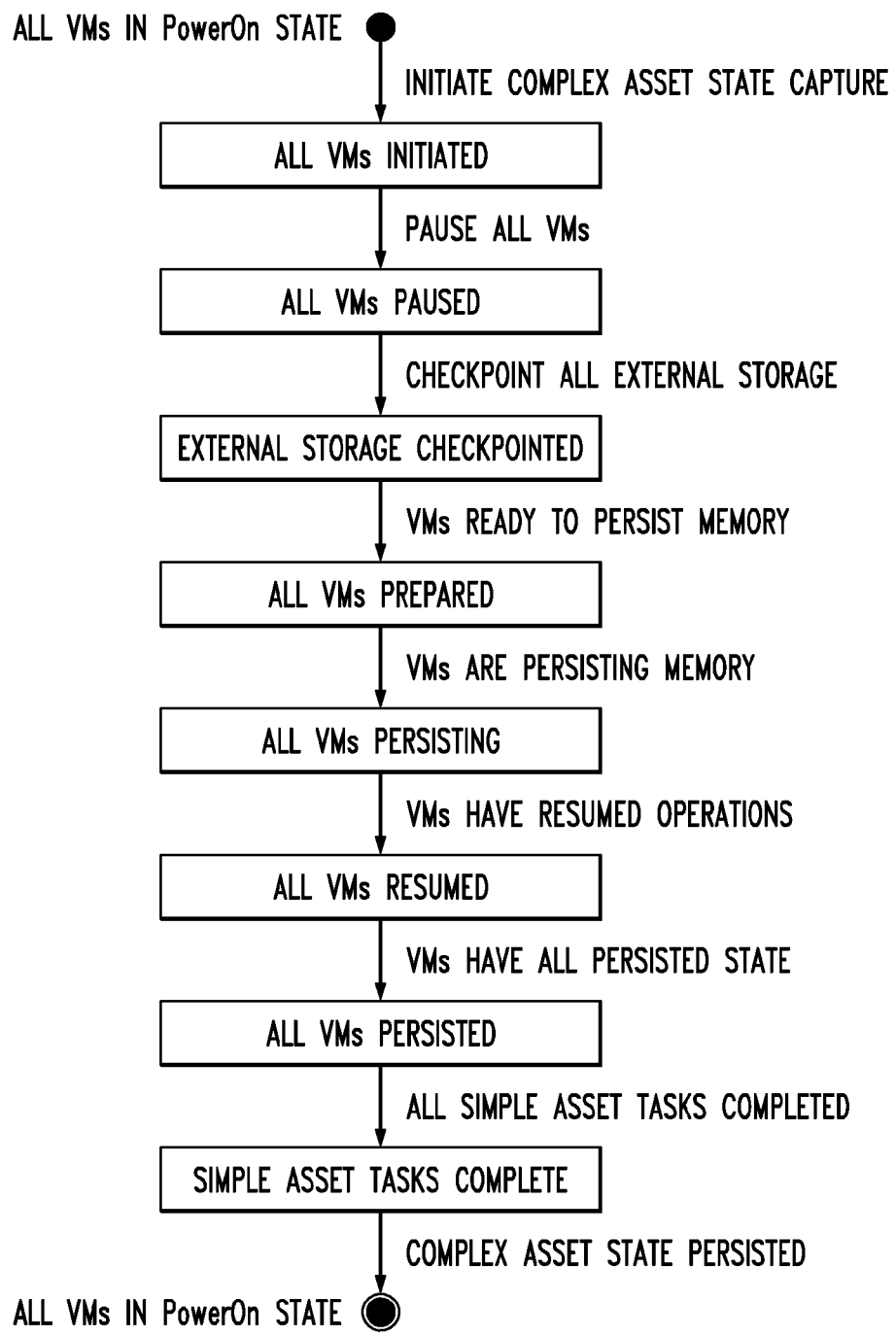
FIG. 7 illustrates a state machine showing state transitions for complex asset persistence.
Figure 16:
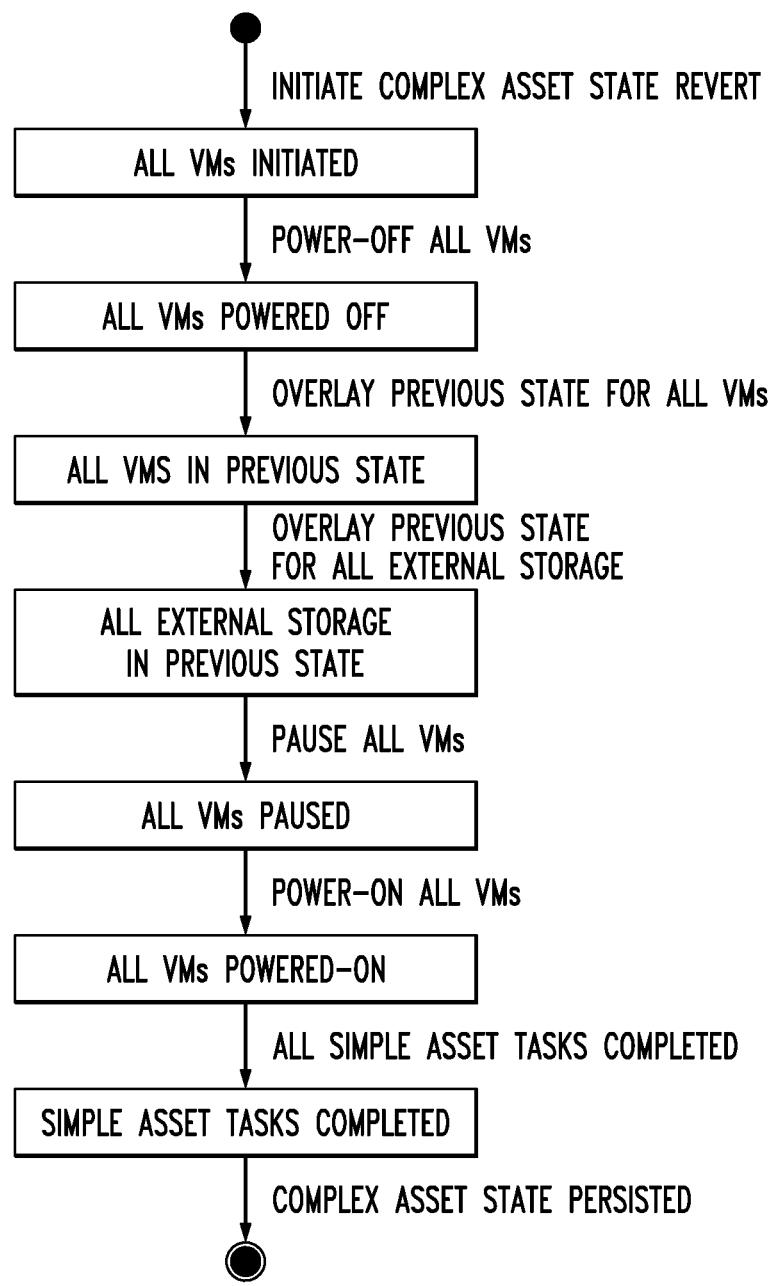
FIG. 16 illustrates a state machine showing state transitions for complex asset reversion.

Corresponding state diagrams for complex asset persistence and reversion based on the simple asset models of FIGS. 3 through 6 are shown in FIGS. 7 and 16, respectively. Composite states of the FIG. 7 complex asset persistence state diagram are shown in greater detail in respective FIGS. 8-15, while composite states of the FIG. 16 complex asset reversion state diagram are shown in greater detail in respective FIGS. 17-23.

The state models of FIGS. 3 through 6 generally characterize the simple assets operations that make up a given complex asset operation. These simple asset state models therefore provide an abstraction that allows complex asset capture and revert operations of the capture/revert module 102 to be decoupled from the particular capture and revert mechanisms utilized by the associated simple assets.

Referring now to FIG. 3, the virtual machine persistence state model defines a generic set of states that any virtual machine should transition between during its state capture process in order to enable the higher level complex asset state capture. The state capture process creates a virtual machine image at a point-in-time denoted as time $t_{pit}$. The states of the model include: Initiated, Paused, Prepared, Persisting, Resumed, Persisted, and Completed. The times associated with the task completion are: $t_{begin}$, $t_{initiated}$, $t_{paused}$, $t_{prepared}$, $t_{persisting}$, $t_{resumed}$, $t_{persisted}$, $t_{completed}$, and $t_{end}$, where $t_{begin} < t_{initiated} < t_{paused} < t_{prepared} < t_{persisting} < t_{resumned} < t_{persisted} < t_{completed} < t_{end}$.

When the state capture process is started, at time $t_{begin}$, the virtualization platform should perform all relevant operations to place the virtual machine into a state where it is ready to be paused; preparation occurs in the Initiated state. By performing this initial setup it becomes possible to immediately pause a virtual machine because all overhead has been accounted for already. At this point it is now time $t_{initiated}$.

The next state is called the Paused state. Once a virtual machine enters this state it no longer can perform any operations. The CPU, memory, and I/O channels are all static; it is now time $t_{pause}$ and $t_{pit}$. At this point the virtual machine will undergo a preparation process to ensure the virtual machine image being persisted remains at time $t_{pit}$ after the virtual machine itself is Resumed. Once all operations to prepare the paused virtual machine have been performed it is Prepared and the time is $t_{prepared}$.

Now the virtual machine's image can begin persisting. This is when memory starts to be written to storage, and disk (provided via the hypervisor) has its delta taken. When the process begins the task has entered the Persisting state and the time is $t_{persisting}$.

While the virtual machine image is being written it is possible to once again schedule the virtual machine, thus allowing CPU operations to resume, memory to be augmented, and the I/O channels to be utilized. When these activities are again possible the virtual machine has entered the Resumed state and it is time $t_{resume}$. Even though productive work is underway inside the virtual machine, it is not possible to claim its state has been fully written for time $t_{pit}$. To make this assertion the virtual machine image should be persisted in its entirety. This will occur at time $t_{completed}$ when the task enters the Completed state. Eventually the image is fully persisted and all operations associated with managing the image are performed. At that moment it is time $t_{end}$ and the entire virtual machine state capture task has executed.

The virtual machine reversion state model shown in FIG. 4 defines a generic set of states that any virtual machine should transition between during its state revert process in order to enable higher level complex asset state revert. The reverting process places the virtual machine into the state it was captured in at time $t_{pit}$. It does this by overlaying the virtual machine image taken at time $t_{pit}$. The states are: Initiated, PowerOff, Overlayed, Ready, Paused, PoweredOn, and Completed. The times associated with the task completion are: $t_{begin}$, $t_{initiated}$, $t_{poweredOff}$, $t_{overlayed}$, $t_{ready}$, $t_{paused}$, $t_{poweredOn}$, $t_{completed}$, and $t_{end}$, where $t_{begin} < t_{initiated} < t_{poweredOff} < t_{overlayed} < t_{ready} < t_{paused} < t_{poweredOn} < t_{completed} < t_{end}$.

When the state revert task is started, at time $t_{begin}$, the virtualization platform should perform all relevant operations to place the virtual machine into a state where it is ready to be shut down; preparation occurs in the Initiated state. By performing this initial setup it becomes possible to immediately powerOff a virtual machine because all overhead has been accounted for already. At this point it is now time $t_{initiated}$.

The next state is called the PoweredOff state. Once a virtual machine enters this state it no longer can perform any operations because it has relinquished all resources it held to the virtualization platform; it is now time $t_{poweredOff}$. At this point the virtual machine will undergo an overlay process to revert its image back to time $t_{pit}$. This includes staging memory from storage, and reverting disk (provided via the hypervisor). The virtualization platform should only stage enough memory to create a running working set, which is the minimal memory necessary to schedule the virtual machine. All subsequent memory can be loaded while the VM is live. It is now $t_{overlayed}$ and the virtual machine is in the Overlayed state. Preparations are underway to ready the virtual machine to be paused.

While these activities occur the virtual machine is in a Ready state. It is reclaiming resources, which were relinquished at time $t_{powerOff}$. Eventually the task is ready to pause the virtual machine. At time $t_{paused}$ the virtual machine has been brought back to life, but has yet to be scheduled. While it waits the CPU, memory, and I/O channels are all static. The virtual machine is in the Paused state. Then the virtual machine begins executing operation after being scheduled by the virtualization platform at time $t_{poweredOn}$. The task quickly transitions to the Completed state at time $t_{completed}$ after all management operations have finished. It is now time $t_{end}$ because all operations associated with the virtual machine state revert task have been executed.

FIG. 5 defines a generic set of states that any external storage volume should transition between during its state capture process in order to enable higher level complex asset state capture. The state capture process creates an external storage volume checkpoint at a point-in-time; time $t_{pit}$. The states are: Initiated, Locked, Prepared, Persisting, Unlocked, Persisted, and Completed. The times associated with the task completion are: $t_{begin}$, $t_{initiated}$, $t_{locked}$, $t_{prepared}$, $t_{persisting}$, $t_{unlocked}$, $t_{persisted}$, $t_{completed}$, and $t_{ends}$ where $t_{begin} < t_{initiated} < t_{unlocked} < t_{prepared} < t_{persisting} < t_{unlocked} < t_{persisted} < t_{completed} < t_{end}$.

When the state capture task is started, at time $t_{begin}$, the external storage platform should perform all relevant operations to place storage into a state where it is ready to be locked; preparation occurs in the Initiated state. By performing this initial setup it becomes possible to immediately lock storage because all overhead has been accounted for already. At this point it is now time $t_{initiated}$.

The next state is called the Locked state. Once storage enters this state it no longer can perform any operations on the locked volume or its cache; it is now time $t_{locked}$ and $t_{pit}$. At this point storage undergoes a preparation process ensuring the volume being checkpointed remains at time $t_{pit}$ even after it is Unlocked. Once all operations to prepare the locked storage volume have occurred it is Prepared and the time is $t_{prepared}$.

Now the storage volume checkpoint can be taken. This is when cache begins being written to the checkpoint, and the disk delta is taken. When the process begins the task has entered the Persisting state and the time is $t_{persisting}$.

While the storage is being checkpointed it is possible to once again allow operations on the cache and changes to the volume. This is possible because of the requirement in the present embodiment for storage platforms to ensure the volume being checkpointed remains at time $t_{pit}$ after it is Unlocked. It is now time $t_{unlocked}$ and the state is Unlocked. Even though productive work is underway again, it is not possible to claim its state has been fully written for time $t_{pit}$. To make this assertion the storage should be checkpointed in its entirety. This will occur at time $t_{completed}$ when the task enters the Completed state. Eventually cache is fully persisted, the disk delta is created, and all operations associated with managing the checkpoint are performed. At that moment it is time $t_{end}$ and the entire external storage volume state capture task has executed.

FIG. 6 defines a generic set of states that any external storage volume should transition between during its state revert process in order to enable the higher level complex asset state revert. The reverting process places the external storage volume into the state it was captured in at time $t_{pit}$. It does this by overlaying the checkpoint taken at time $t_{pit}$. The states are: Initiated, Locked, Overlayed, Ready, Unlocked, and Completed. The times associated with the task completion are: $t_{begin}$, $t_{initiated}$, $t_{locked}$, $t_{overlayed}$, $t_{ready}$, $t_{unlocked}$, $t_{completed}$, and $t_{end}$ where $t_{begin} < t_{initiatated} < t_{locked} < t_{overlayed} < t_{ready} < t_{unlocked} < t_{completed} < t_{end}$.

When the state capture task is started, at time $t_{begin}$, the external storage platform should perform all relevant operations to place storage into a state where it is ready to be locked; preparation occurs in the Initiated state. By performing this initial setup it becomes possible to immediately lock storage because all overhead has been accounted for already. At this point it is now time $t_{initiated}$.

The next state is called the Locked state. Once storage enters this state it no longer can perform any operations on the locked volume or its cache; it is now time $t_{locked}$. At this point the storage will undergo an overlay process to revert its volume back to time $t_{pit}$. This includes: starting staging cache from storage, and reverting disk. It is now $t_{overlayed}$ and storage is in the Overlayed state. Preparations are underway to ready the storage to be unlocked.

While these activities occur the storage is in a Ready state. It is finalizing cache operations to bring memory back to time $t_{pit}$ and also wrapping up operations associated with disk revert. Eventually the task is ready to unlock storage. Then it happens, the storage platform begins accepting operations for the volume at time $t_{unlocked}$. The task quickly transitions to the Completed state at time $t_{completed}$ after all management operations have finished. It is now time $t_{end}$ because all operations associated with the external storage volume state revert task have been executed.

The manner in which point-in-time consistency is provided for complex asset state capture will now be described in greater detail with reference to the complex asset persistence state machine of FIG. 7. All simple assets within a complex asset are persisted following complex asset state capture. The complex asset capture task will create a state snapshot of the targeted complex asset at a time $t_{pit}$, where $t_{pit}$ is the point-in-time state associated with the complex asset snapshot and thus by definition the same point-in-time state associated with each simple asset as well. It should not be the case that any simple asset subset, contained within the complex asset, is persisted with a state $t_{pit+m}$: where pit is the point-in-time state, and m is any positive or negative rational number.

As was noted above for simple asset state capture tasks, it is possible to initiate state capture of a complex asset, and resume complex asset operations while its delta is being created. This is apparent from the simple asset state capture descriptions above. More particularly, simple assets may be required to transition between a Paused/Locked, Persisting, and Resumed/Unlocked states; all before entering the Persisted state.

An individual complex asset snapshot can be taken at any time $t_{req}$: where req is the time associated with the request. Assume that complex asset snapshot $t_{req}$ is the first complex asset snapshot for a particular complex asset. Subsequent complex asset snapshots may be taken at time $t_{i+p}$: where i is the time associated with the most recent complex asset snapshot ($t_{req}$ if only an initial snapshot exists) and p is any positive rational number. Further, time $t_{safe}$ is defined, where safe is the earliest time a subsequent state capture task can be initiated following $t_{req}$ for any given simple asset platform. In this manner it follows that $t_{i+p} >= t_{safe}$ must be true.

In the FIG. 7 persistence state machine, there are eight states, listed below with corresponding acronyms:

All Virtual Machines Initiated (avmi)
All Virtual Machines Paused (avmpa)
All External Storage Checkpointed (aesc)
All Virtual Machines Prepared (avmpr)
All Virtual Machines Persisting (avmpg)
All Virtual Machines Resumed (avmr)
All Virtual Machines Persisted (avmpd)
All Simple Asset Tasks Complete (asatc)

These eight composite states of the FIG. 7 state diagram are illustrated in FIGS. 8-15, respectively.

Times associated with the composite states are: $t_{begin}$, $t_{avmi}$, $t_{avmpa}$, $t_{aesc}$, $t_{avmpr}$, $t_{avmpg}$, $t_{avmr}$, $t_{avmpd}$, $t_{asact}$, and $t_{ends}$, where $t_{begin} < t_{avmi} < t_{avmpa} < t_{aesc} < t_{avmpr} < t_{avmpg} < t_{avmr} < t_{awmpd} < t_{asact} < t_{end}$.

Complex asset state capture is really a coordination problem, relating to state capture task phases, associated with its simple assets. When a complex asset state capture task is started at time $t_{begin}$ it causes the complex asset's virtual machines to transition into an Initiated state. At which point every virtual machine will have performed the necessary operations allowing them to be paused immediately. The complex asset initiation phase concludes when all virtual machines are Initiated at time $t_{avmi}$. The state capture process continues by transitioning out of AVMI when all virtual machines enter their Paused state, which will immediately freeze all operations occurring within the complex asset at time $t_{avmpa}$.

Freezing operations across all virtual machines at a nearly instantaneous moment ensures reliable network protocols can recover upon complex asset revert. Additionally, it allows network traffic being transmitted across unreliable protocols to recover when an appropriately large inbound network cache is associated with the virtual machines. In this scenario the packet cache can be persisted with its virtual machine state image. It is now safe to checkpoint any external storage volumes associated with the complex asset because no virtual machines operations are executing to augment storage.

As the transition between AVMPA to AESC occurs the external storage platforms lock volumes, persist cache, and create disk deltas. Eventually all external storage enters its Unlocked state, thus signaling it's safe to continue complex asset state capture. It is now time $t_{aesc}$. After AESC the virtual machines transition from their Paused to Prepared states representing $t_{pit}$ for this type of simple asset. When it occurs the complex asset has entered the AVMPR state signaling $t_{pit}$ for the complex asset at time $t_{avmpr}$. From this moment forward, as long as the complex asset state capture process reaches $t_{end}$, it will be possible to revert the complex asset to this point-in-time.

Moving forward, all virtual machines enter the Persisting state at time $t_{avmpg}$. It is now possible to transition from AVMPG to AVMR. Transitioning in this embodiment requires all virtual machines to enter their Resumed state, which once again schedules them on the hypervisor. It is now $t_{avmr}$ and productive work is underway across the complex asset. Even though the complex asset is live, it is not possible to claim its state has been fully written for time $t_{pit}$. To make this assertion all simple asset state capture tasks must reach their Completed state and it must be time $t_{end}$. Reaching this state in the present embodiment requires virtual machines to first transition into their Persisted state, which will occur at time $t_{avmpd}$. Each virtual machine image has fully persisted and the transition between AVMPD to all ASATC is underway. During which time all operations associated with managing the simple asset state capture tasks are finalized. Time $t_{asact}$ passes and gives way to $t_{end}$ signifying the entire complex asset state has been captured.

The manner in which point-in-time consistency is provided for complex asset state reversion will now be described in greater detail with reference to the complex asset reversion state machine of FIG. 16. All simple assets within a complex asset have a previous state overlaid following complex asset state revert. The complex asset revert task will overlay state $t_{pit}$ of a targeted complex asset, where $t_{pit}$ is the point-in-time state associated with the complex asset snapshot and thus by definition the same point-in-time state associated with each simple asset as well. It should not be the case that any simple asset subset, contained within the complex asset, is reverted to a state $t_{pit+m}$: where pit is the point-in-time state, and m is any positive or negative rational number.

As was noted above for simple asset state revert tasks, it is possible to initiate state revert of a complex asset, and resume complex asset operations while its delta is being overlaid. This is apparent from the simple asset state revert descriptions above. More particularly, it is possible to Resume/Unlock a simple asset upon build a working set for virtual memory associated with a virtual machine, and cache associated with external storage.

An individual complex asset can be reverted at any time $t_{req}$ when at least one complex asset snapshot has been taken, where req is the time associated with the snapshot revert request. Assume that complex asset snapshot $t_{req}$ is being reverted. Subsequent complex asset revert request can be issued at any time $t_{req+p}$: where p is any positive rational number. This is the case because any operations associated with revert request $t_{req}$ can simply be discarded allowing request $t_{req+p}$ to start.

In the FIG. 16 reversion state machine, there are seven states, listed below with corresponding acronyms:
All Virtual Machines Initiated (avmi)
All Virtual Machines PoweredOff (avmpf)
All Virtual Machines in Previous State (avmps)
All External Storage in Previous State (aesps)
All Virtual Machines Paused (avmpd)
All Virtual Machines PoweredOn (avmpn)
All Simple Asset Tasks Complete (asatc)

These seven composite states of the FIG. 16 state diagram are illustrated in FIGS. 17-23, respectively.

Times associated with the composite states are: $t_{begin}$, $t_{avmi}$, $t_{avmpf}$, $t_{avmps}$, $t_{aesps}$, $t_{avmpd}$, $t_{avmpn}$, $t_{asact}$, and $t_{ends}$, where $t_{begin} < t_{avmi} < t_{avmpf} < t_{avmps} < t_{aesps} < t_{avmpd} < t_{avmpn} < t_{asact} < t_{end}$.

Complex asset state revert is a coordination problem, relating to state revert task phases, associated with its simple assets. When a complex asset state revert task is started at time $t_{begin}$ it causes the complex asset's virtual machines to transition into an Initiated state. At which point every virtual machine will have performed the necessary operations allowing them to be powered off. The complex asset initiation phase concludes when all virtual machines are Initiated at time $t_{avmi}$.

The state revert process continues by transitioning out of AVMI when all virtual machines enter their PoweredOff state, which causes the virtual machines to relinquish all held resources back to the virtualization platform at time $t_{avmpf}$. Transitioning out of AVMPF means that every virtual machine will undergo an overlay process to revert its image back to time $t_{pit}$. Once all virtual machines have entered their Overlaid states it will be time $t_{avmps}$.

When AVMPS has been reached it means that every virtual machine has loaded its inbound network cache, reverted its storage (provided via the hypervisor), and staged an appropriate memory working set; thus allowing it to begin transitioning into the Ready state. During this time each external storage volume will have its state overlaid by reverting to the checkpoint associated with $t_{pit}$. The transition to AESPS signals that all storage volumes have reached their Unlocked state at time $t_{aesps}$.

Now that all virtual machines are in the Ready state and all storage volumes are in the Unlocked state the complex asset is at state $t_{pit}$. It's now time $t_{aesps}$ and the transition to AVMPD takes place, which means the virtual machines will begin reclaiming resources relinquished at PowerOff. At time $t_{avmpd}$ the virtual machines have been brought back to life, but have yet to be scheduled. They are in their Paused state. Eventually the transition to AVMPN occurs causing all virtual machines to begin executing operations at time $t_{avmpn}$. The task quickly transitions to the ASATC state after all simple asset revert tasks finalize at time $t_{asatc}$. Additional management operations by the complex asset state revert task take the process to time $t_{end}$.

It should be noted that the particular states, transitions and other features of the capture/revert functionality described in conjunction with the diagrams of FIGS. 3 through 23 are presented by way of illustrative example only, and should not be construed as limiting the scope of the invention in any way. Alternative embodiments can use other types of states, transitions and features.

As indicated above, the illustrative embodiments advantageously overcome the drawbacks of conventional approaches that fail to provide adequate persistence of and reversion to complex asset state in distributed infrastructure. For example, one or more of these embodiments allows point-in-time state capture and revert to be implemented in an unobtrusive and dynamic manner for complex assets, including a complex asset that comprises one or more virtual machines and one or more associated external storage volumes that are not visible to or controllable by a corresponding virtual machine hypervisor. Also, these improved techniques do not require the use of specialized virtual switches and are not otherwise constrained to a particular type of distributed infrastructure, and can therefore be readily implemented within existing distributed infrastructure.

Functionality such as that described in conjunction with the diagrams of FIGS. 3 through 23 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the techniques are applicable to a wide variety of other types of information processing systems, processing devices and distributed infrastructure arrangements. Also, alternative state diagrams may be used to implement the disclosed capture/revert functionality. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a processing platform comprising at least one processing device having a processor coupled to a memory;
wherein the processing platform implements a complex asset capture/revert module, said module comprising a persistence state machine and a reversion state machine and being configured to coordinate capture via the persistence state machine of a point-in-time state of a complex asset of distributed infrastructure of an information processing system and subsequently to coordinate revert via the reversion state machine of the complex asset to the point-in-time state;
wherein the persistence state machine is configured to capture the point-in-time state of the complex asset in a manner which permits operation of the complex asset during at least a portion of said capture;
wherein the reversion state machine is configured to revert the complex asset to the point-in-time state in a manner which permits operation of the complex asset during at least a portion of said revert;
wherein the complex asset comprises a combination of two or more simple assets, the two or more simple assets comprising:
a first simple asset comprising at least one virtual machine controlled by a given hypervisor; and
a second simple asset comprising at least one of a virtual machine that is not visible to or controllable by the given hypervisor, and an external storage volume that is not visible to or controllable by the given hypervisor;
wherein the point-in-time state of the complex asset comprises snapshots of each simple asset of the complex asset at a given point in time; and
wherein the complex asset capture/revert module is configured to coordinate capture and revert of the point-in-time state of the complex asset by coordinating transitions of a plurality of states of each simple asset in the complex asset.

2. The apparatus of claim 1 wherein the complex asset comprises a combination of at least one virtual machine and at least one external storage volume that is not visible to or controllable by a hypervisor that controls the virtual machine.

3. The apparatus of claim 1 wherein the persistence state machine is configured to associate simple asset capture states with corresponding complex asset capture states.

4. The apparatus of claim 1 wherein the persistence state machine is based at least in part on a virtual machine persistence state model and a storage persistence state model.

5. The apparatus of claim 4 wherein the virtual machine persistence state model comprises states of initiated, paused, prepared, persisting, resumed, persisted and completed.

6. The apparatus of claim 4 wherein the storage persistence state model comprises states of initiated, locked, prepared, persisting, unlocked, persisted and completed.

7. The apparatus of claim 1 wherein the reversion state machine is configured to associate simple asset revert states with corresponding complex asset revert states.

8. The apparatus of claim 1 wherein the reversion state machine is based at least in part on a virtual machine reversion state model and a storage reversion state model.

9. The apparatus of claim 8 wherein the virtual machine reversion state model comprises states of initiated, powered off, overlayed, ready, paused, powered on and completed.

10. The apparatus of claim 8 wherein the storage reversion state model comprises states of initiated, locked, overlayed, ready, unlocked and completed.

11. The apparatus of claim 1 wherein the persistence state machine comprises a plurality of states including one or more of:
an all virtual machines initiated state;
an all virtual machines paused state;
an external storage checkpointed state;
an all virtual machines prepared state;
an all virtual machines persisting state;
an all virtual machines resumed state;
an all virtual machines persisted state; and
a simple asset tasks complete state;
wherein one or more of the states of the persistence state machine comprise composite states.

12. The apparatus of claim 1 wherein the reversion state machine comprises a plurality of states including one or more of:
an all virtual machines initiated state;
an all virtual machines powered off state;
an all virtual machines reverted state;
an all external storage reverted state;
an all virtual machines paused state;

an all virtual machines powered on state; and a simple asset tasks complete state wherein one or more of the states of the reversion state machine comprise composite states.

13. The apparatus of claim 1 wherein the processing platform also implements at least a portion of the complex asset.

14. The apparatus of claim 1 wherein the processing platform is separate from each of one or more other processing platforms used to implement the complex asset.

15. A method for use in an information processing system comprising distributed infrastructure, the method comprising the steps of:

providing a complex asset capture/revert module having a persistence state machine and a reversion state machine;

coordinating capture via the persistence state machine of a point-in-time state of a complex asset of the distributed infrastructure; and subsequently coordinating revert via the reversion state machine of the complex asset to the point-in-time state;

wherein the persistence state machine is configured to capture the point-in-time state of the complex asset in a manner which permits operation of the complex asset during at least a portion of said capture;

wherein the reversion state machine is configured to revert the complex asset to the point-in-time state in a manner which permits operation of the complex asset during at least a portion of said revert;

wherein the complex asset comprises a combination of two or more simple assets, the two or more simple assets comprising:

a first simple asset comprising at least one virtual machine controlled by a given hypervisor; and a second simple asset comprising at least one of a virtual machine that is not visible to or controllable by the given hypervisor, and an external storage volume that is not visible to or controllable by the given hypervisor;

wherein the point-in-time state of the complex asset comprises snapshots of each simple asset of the complex asset at a given point in time and wherein the complex asset capture/revert module is configured to coordinate capture and revert of the point-in-time state of the complex asset by coordinating transitions of a plurality of states of each simple asset in the complex asset.

16. The method of claim 15 wherein the complex asset comprises a combination of at least one virtual machine and at least one external storage volume that is not visible to or controllable by a hypervisor that controls the virtual machine.

17. The method of claim 15 wherein the persistence state machine is configured to associate simple asset capture states with corresponding complex asset capture states, and the reversion state machine is configured to associate simple asset revert states with corresponding complex asset revert states.

18. A computer program product comprising a non-transitory processor-readable storage medium having encoded therein executable code of one or more software programs, wherein the one or more software programs when executed by a processor of a processing device implement the steps of the method of claim 15.

19. An information processing system comprising:

distributed infrastructure comprising at least one complex asset; and a complex asset capture/revert module associated with the distributed infrastructure, said module comprising a persistence state machine and a reversion state machine and being configured to coordinate capture via the persistence state machine of a point-in-time state of the complex asset of the distributed infrastructure and subsequently to coordinate revert via the reversion state machine of the complex asset to the point-in-time state;

wherein the persistence state machine is configured to capture the point-in-time state of the complex asset in a manner which permits operation of the complex asset during at least a portion of said capture;

wherein the reversion state machine is configured to revert the complex asset to the point-in-time state in a manner which permits operation of the complex asset during at least a portion of said revert;

wherein the complex asset comprises a combination of two or more simple assets, the two or more simple assets comprising:

a first simple asset comprising at least one virtual machine controlled by a given hypervisor; and a second simple asset comprising at least one of a virtual machine that is not visible to or controllable by the given hypervisor, and an external storage volume that is not visible to or controllable by the given hypervisor;

wherein the point-in-time state of the complex asset comprises snapshots of each simple asset of the complex asset at a given point in time; and wherein the complex asset capture/revert module is configured to coordinate capture and revert of the point-in-time state of the complex asset by coordinating transitions of a plurality of states of each simple asset in the complex asset.

20. The system of claim 19 wherein the complex asset capture/revert module is implemented at least in part within a processing platform of the distributed infrastructure.

21. The apparatus of claim 1 wherein the persistence state machine is a non-blocking asynchronous persistence state machine and wherein the reversion state machine is a non-blocking asynchronous reversion state machine.

22. The apparatus of claim 1 wherein the persistence state machine is configured to permit central processing unit operations, memory operations and input/output channel utilization in at least one of a virtual machine and an external storage volume of the complex asset during said capture.

23. The apparatus of claim 1 wherein the reversion state machine permits central processing unit operations, memory operations and input/output channel utilization in at least one of a virtual machine and an external storage volume of the complex asset during said revert.

24. The apparatus of claim 1 wherein the persistence state machine is further configured to capture state of the complex asset by:

persisting a virtual machine image of at least one virtual machine while the at least one virtual machine remains active; and persisting a cache of at least one external storage volume while permitting operations and changes to the at least one external storage volume.

25. The apparatus of claim 1 wherein the reversion state machine is further configured to revert the captured state of the complex asset by:

loading an initial portion of a virtual machine image sufficient to begin execution of at least one virtual machine while a remaining portion of the virtual machine is loaded; and loading an initial portion of a cache associated with at least one external storage volume in a locked state and unlocking the at least one external storage volume while a remaining portion of the cache is loaded.

26. The apparatus of claim 1 wherein the complex asset comprises a combination of multiple virtual machines.

27. The apparatus of claim 1 wherein the complex asset comprises a combination of multiple external storage volumes.

\* \* \* \* \*